US012546719B2

United States Patent
Nick et al.

(10) Patent No.: US 12,546,719 B2
(45) Date of Patent: Feb. 10, 2026

(54) DEVELOPMENT OF A PHOTOBLEACHING DEVICE AND USES THEREOF

(71) Applicant: University of Florida Research Foundation, Incorporated, Gainesville, FL (US)

(72) Inventors: Harry S. Nick, Gainesville, FL (US); Clive H. Wasserfall, Gainesville, FL (US); Seth W. Currlin, Gainesville, FL (US); Jerelyn A. Nick, Gainesville, FL (US); Andrew J. Nick, Merritt Island, FL (US)

(73) Assignee: University of Florida Research Foundation, Incorporated, Gainesville, FL (US)

( * ) Notice: Subject to any disclaimer, the term of this patent is extended or adjusted under 35 U.S.C. 154(b) by 253 days.

(21) Appl. No.: 18/323,727

(22) Filed: May 25, 2023

(65) Prior Publication Data

US 2023/0384222 A1   Nov. 30, 2023

Related U.S. Application Data

(60) Provisional application No. 63/365,378, filed on May 26, 2022.

(51) Int. Cl.
*G01N 21/64* (2006.01)

(52) U.S. Cl.
CPC . *G01N 21/6428* (2013.01); *G01N 2021/6432* (2013.01); *G01N 2201/062* (2013.01); *G01N 2201/0636* (2013.01)

(58) Field of Classification Search
CPC ....... G01N 21/6428; G01N 2021/6432; G01N 2201/062; G01N 2201/0636; G01N 21/6458; G01N 21/6486
See application file for complete search history.

(56) References Cited

U.S. PATENT DOCUMENTS 5,459,322 A * 10/1995 Warkentin .......... A61M 1/3681
250/455.11
2013/0137119 A1* 5/2013 Wilkes ............... G01N 21/6486
435/7.37

(Continued)

OTHER PUBLICATIONS

Schleusener et al. "Depth-dependent autofluorescence photobleaching using 325, 473, 633, and 785 nm of porcine ear skin ex vivo", Journal of Biomedical Optics 22(9), Sep. 2017, p. 091503-1-091503-9 (Year: 2017).*

(Continued)

*Primary Examiner* — David J Makiya
*Assistant Examiner* — Mamadou Faye
(74) *Attorney, Agent, or Firm* — Alston & Bird LLP

(57) ABSTRACT

Autofluorescence is the inherent emission of light from cells or tissues that occurs when biological samples are exposed to different wavelengths of excitation light. Tissue autofluorescence is usually ascribed to biological components such as flavins, porphyrins, chlorophyll (in plants), collagen, elastin, red blood cells (RBCs), and lipofuscin. Tissue autofluorescence often presents a significant problem in microscopy, pathology, and surgical applications. Autofluorescence interferes and complicates signal detection in a variety of fluorescence microscopy methods. Tissue autofluorescence reduces the signal detection sensitivity, and in some cases may cause failure in the detection of fluorescent dye signals. Accordingly, there is a need for further improved methods to decrease the autofluorescence intensity from microscopy samples both in research and clinical venues. Described herein is a photobleaching device utilizing a light source tuned to the full spectrum of light to quench autofluorescence of a biological sample.

20 Claims, 3 Drawing Sheets

(56) References Cited

U.S. PATENT DOCUMENTS

Figure 1:
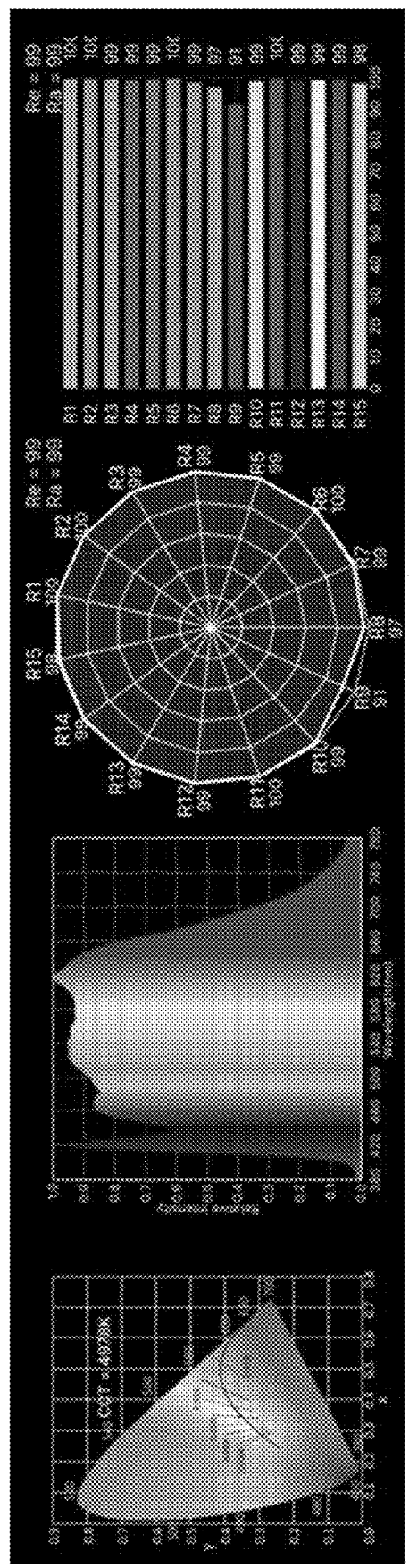

2017/0188914 A1* 7/2017 Dutta .................. A61B 5/1455
2019/0070323 A1* 3/2019 Atreya .................. A61L 2/084
2023/0343905 A1* 10/2023 Oshio ................ H10H 20/8515

OTHER PUBLICATIONS

Kingsley et al. "Photobleaching of Arterial Autofluorescence for Immunofluorescence Applications", BioTechniques, vol. 30, No. 4, 2001, p. 794-797. (Year: 2001).*

"Absolute SeriesTM LED Linear Module-99 CRI-1 ft/280mm MCPCB," *Waveform Lighting*, (Year: 2023), (25 pages), [Retrieved from the Internet Jul. 28, 2023] <URL: https://store.waveformlighting.com/products/absolute-series-99-cri-led-linear-module?src-pse>.

"Customer Demonstrated Protocol: CODEX Solutions," *Akoya Biosciences*, Mar. 2020, (2 pages), available online: https://www.akoyabio.com/wp-content/uploads/2020/07/Customer-Demonstrated-Protocol-Autofluorescence-Quenching-Mar2020.pdf.

"The Human BioMolecular Atlas Program (HuBMAP)," *National Institutes of Health—NIH Common Fund*, Jul. 20, 2023, (3 pages), (article), [Retrieved from the Internet Jul. 28, 2023] <URL: https://commonfund.nih.gov/hubmap>.

Davis, A. Sally et al. "Characterizing and Diminishing Autofluorescence In Formalin-Fixed Paraffin-Embedded Human Respiratory Tissue," *Journal of Histochemistry & Cytochmestry*, vol. 62, No. 6, Apr. 10, 2014, pp. 405-423, DOI: 10.1369/00221155414531549.

Du, Ziming et al. "Qualifing Antibodies For Image-Based Immune Profiling and Multiplexed Tissue Imaging," *Nature Protocols*, vol. 14, No. 10, Oct. 2019 (Epub: Sep. 18, 2019), pp. 2900-2930, DOI: 10.1038/s41596-019-0206-y.

Keyence, Keyence Corporation of America, (Year: 2023), (6 pages), [Retrieved from the Internet Aug. 4, 2023] <URL: https://www.keyence.com/>.

* cited by examiner

DEVELOPMENT OF A PHOTOBLEACHING DEVICE AND USES THEREOF

CROSS-REFERENCE TO RELATED APPLICATIONS

This application claims the benefit of and priority to U.S. Provisional Patent Application No. 63/365,378, filed on May 26, 2022, the entire contents of which are incorporated by reference herein.

STATEMENT REGARDING FEDERALLY SPONSORED RESEARCH OR DEVELOPMENT

This invention was made with government support under grant number AI142766, awarded by The National Institutes of Health. The government has certain rights in the invention.

GOVERNMENT EMPLOYEE STATEMENT

The invention described herein was made by employees of the United States Government and may be manufactured or used by or for the Government of the United States of America for governmental purposes without the payment of any royalties thereon or therefor.

BACKGROUND

Autofluorescence is the inherent emission of light from cells or tissues that occurs when biological samples are exposed to different wavelengths of excitation light. The excitation light includes wavelengths from the UV through the entire visible spectrum. Tissue autofluorescence is usually ascribed to biological components such as flavins, porphyrins, chlorophyll (in plants), collagen, elastin, red blood cells (RBCs), and lipofuscin. Tissue autofluorescence often presents a significant problem in microscopy, pathology, and surgical applications. Autofluorescence interferes and complicates signal detection in a variety of fluorescence microscopy methods. Optical fluorescent microscopy is a powerful tool and often the method of choice for biomedical research. Fluorescent microscopy has been used to track specific histological features and/or molecular targets at the cellular level, such as proteins, DNA, RNA, carbohydrates, lipids, etc. Immunofluorescence microscopy, for example, uses specific primary antibodies to detect proteins/antigens in biological/pathological specimens, usually placed on a glass microscope slide and then detected with a wavelength specific fluorophore attached to either the primary or secondary antibody. Issues arise when the emission wavelength of the fluorophore (e.g., 550 nm) overlaps with the endogenous autofluorescence of the cells or tissues. The autofluorescence signal can be stronger than the emission intensity of the fluorophore (dependent on the tissue type and excitation and emission wavelengths) thus precluding the ability to accurately assess cell specific antigen/protein expression. Tissue autofluorescence, thereby, reduces the signal detection sensitivity, and in some cases may cause failure in the detection of fluorescent dye signals. A wide variety of physical and chemical approaches have been evaluated to quench endogenous autofluorescence including ultraviolet light, Eriochrome black T, Sudan black B, sodium borohydride, ammonia, copper (II) sulfate, Trypan Blue, and True-Black™ Lipofusin Autofluorescence Quencher. Many chemical quenchers unfortunately can also diminish or block antigen-antibody interactions. Digitally acquired fluorescence microscope images can also be processed retrospectively using software methods, to separate tissue autofluorescence from the relevant dye fluorescence. Some of these methods rely on acquiring estimates of the pure autofluorescence signal and using them to reduce autofluorescence from images containing both dye and autofluorescence signals by a weighted subtraction. Others use statistical correlation techniques to correct for the additive autofluorescence signal. While these techniques are more cost effective than using multi-spectral imaging hardware, they may not be able to completely reduce the autofluorescence component from fluorescence microscopy images as the autofluorescence may be altered due to treatments used to generate the target-specific signal. Accordingly, there is a need for further improved methods to decrease the autofluorescence intensity from microscopy samples both in research and clinical venues.

SUMMARY

Regulation of autofluorescence is an important target in order to improve signal detection in various fluorescent microscopy protocols. Described herein is a photobleaching device utilizing a light source tuned to the full spectrum of light to quench autofluorescence of a biological sample. Exposing a biological sample to a light source results in reducing autofluorescence of the biological sample. In some embodiments, the device comprises a light source having a Color Rendering Index (CRI) of at least 90, at least 95, at least 96, at least 97, at least 98, or at least 99. Methods of using the device to reduce autofluorescence of a biological sample are also described.

Also described herein are methods for photobleaching a biological sample (e.g., a research or pathological tissue sample), wherein biological samples are exposed to a light source having a CRI of at least 90, at least 95, at least 96, at least 97, at least 98, or at least 99. In some embodiments, the biological sample is irradiated from above and below by at least two light sources. In some embodiments, the biological sample is irradiated from above and below by at least two identical light sources. The biological sample is irradiated by the one or more light sources for at least 1 hour, at least 2 hours, at least 3 hours, at least 4 hours, at least 5 hours, at least 6 hours, at least 7 hours, at least 8 hours, at least 9 hours, at least 10 hours, at least 15 hours, at least 20 hours, at least 24 hours, at least 28 hours at least 32 hours, or at least 36 hours. The biological sample can be exposed to photobleaching light from an achromatic light source emitting light of a band of wavelengths in the visible spectrum or over a broad band of wavelengths.

BRIEF DESCRIPTIONS OF THE DRAWINGS

FIG. 1. Waveform Lighting's provided photometric data for Absolute Series™ LED Linear Module.

Figure 2:
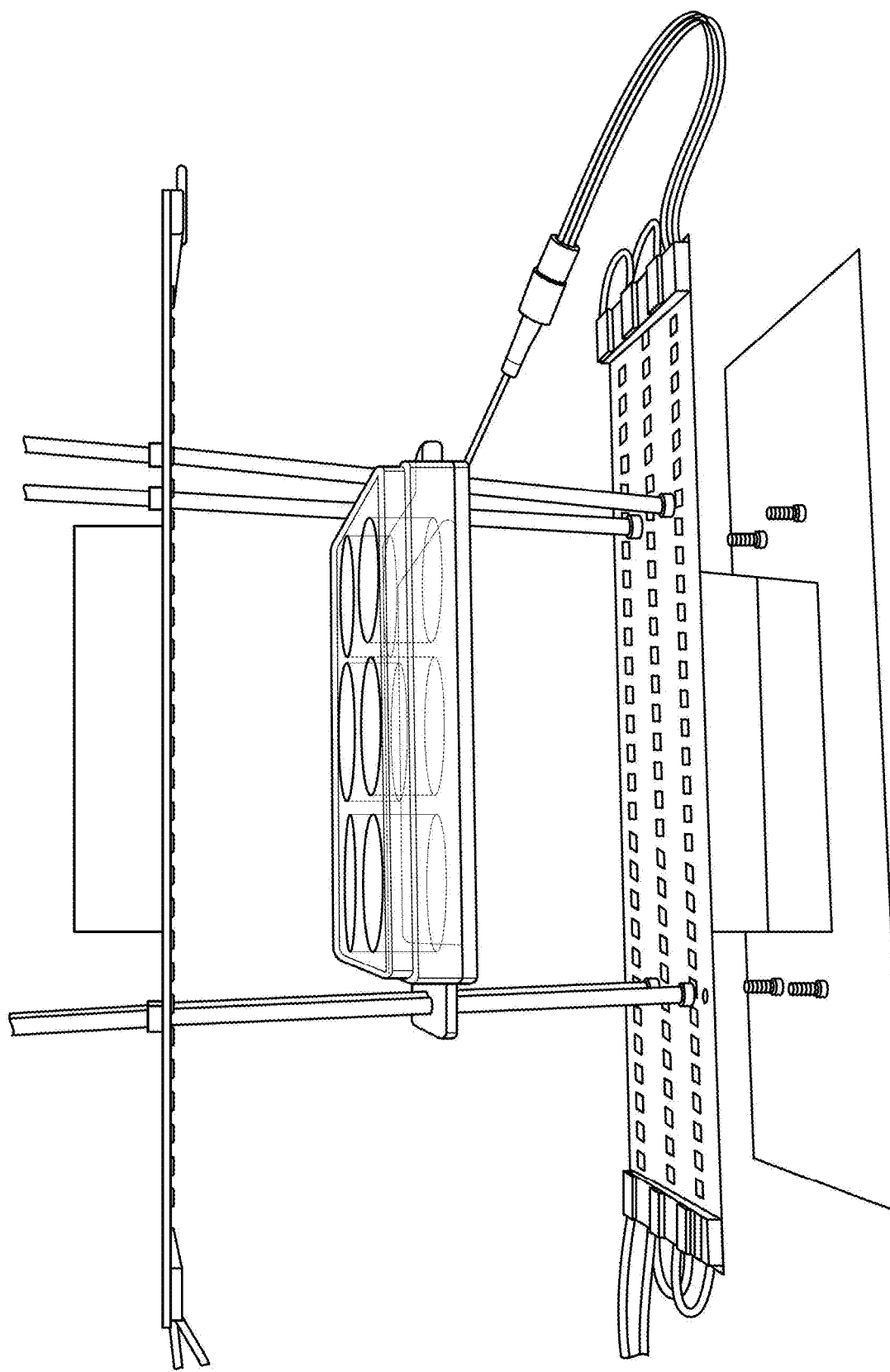

FIG. 2. Schematic of the photobleaching device displaying the linear LED modules in line above and below, sample plate, sample arrangement, etc.

Figure 3A:
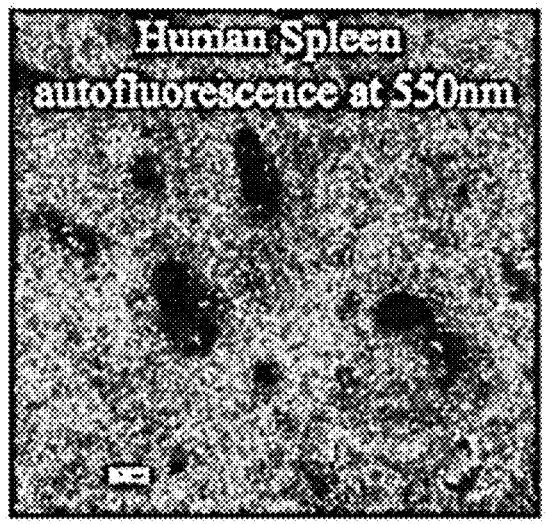
Figure 3B:
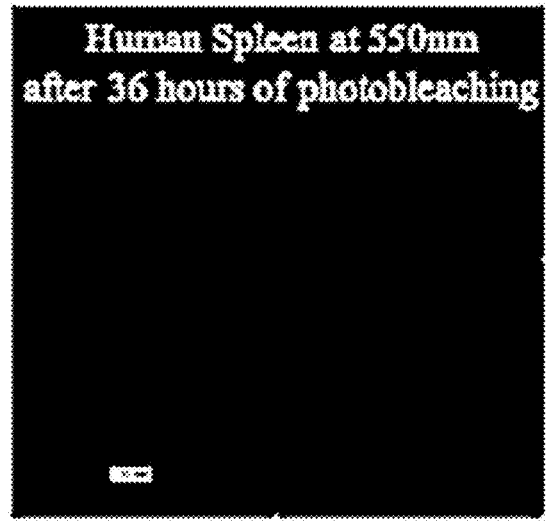
Figure 3C:
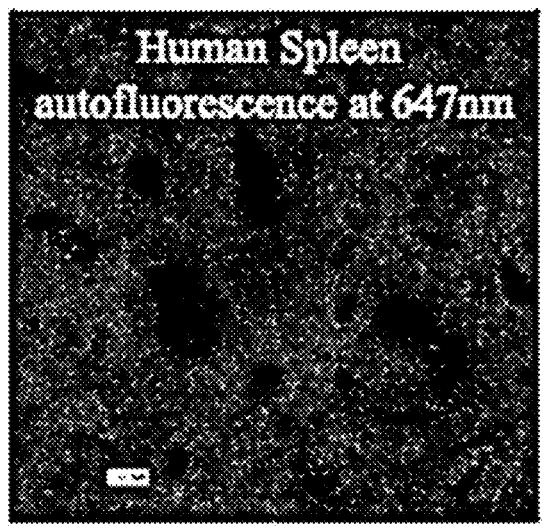
Figure 3D:
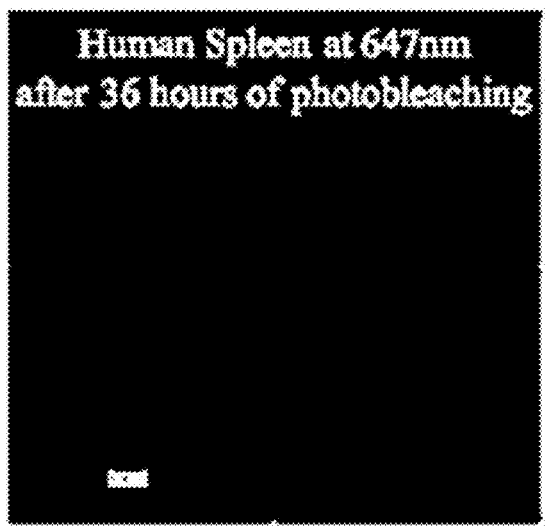

FIGS. 3A-3D Images of human tissue samples before and after photobleaching treatment. FIG. 3A Autofluorescence of a human spleen sample excited at 550 nm. FIG. 3B Autofluorescence of a human spleen sample excited at 550 nm after 36 hours of photobleaching. FIG. 3C Autofluorescence of a human spleen sample excited at 647 nm. FIG. 3D Autofluorescence of a human spleen sample excited at 647 nm after 36 hours of photobleaching.

DETAILED DESCRIPTION

I. Definitions

Unless otherwise defined, all terms of art, notations and other scientific terminology used herein are intended to have the meanings commonly understood by those of skill in the art to which this invention pertains. In some cases, terms with commonly understood meanings are defined herein for clarity and/or for ready reference, and the inclusion of such definitions herein should not necessarily be construed to represent a substantial difference over what is generally understood in the art. The techniques and procedures described or referenced herein are generally well understood and commonly employed using conventional methodology by those skilled in the art. As appropriate, procedures involving the use of commercially available kits and reagents are generally carried out in accordance with manufacturer defined protocols and/or parameters unless otherwise noted.

The use of "comprises," "comprising," "contain," "contains," "containing," "include," "includes," and "including" are not intended to be limiting. It is to be understood that both the foregoing general description and detailed description are exemplary and explanatory only and are not restrictive of the teachings. To the extent that any material incorporated by reference is inconsistent with the express content of this disclosure, the express content controls.

The term "about" or "approximately" indicates within an acceptable error range for the particular value as determined by one of ordinary skill in the art, which will depend in part on how the value is measured or determined, i.e., the limitations of the measurement system. For example, "about" can mean within 1 or more than 1 standard deviation, per the practice in the art. Alternatively, "about" can mean a range of up to 0 to 20%, 0 to 10%, 0 to 5%, or up to 1% of a given value. Where particular values are described in the application and claims, unless otherwise stated the term "about" meaning within an acceptable error range for the particular value should be assumed.

All ranges are to be interpreted as encompassing the endpoints in the absence of express exclusions such as "not including the endpoints"; thus, for example, "within 10-15" includes the values 10 and 15. One skilled in the art will understand that the recited ranges include the end values, as whole numbers in between the end values, and where practical, rational numbers within the range (e.g., the range 5-10 includes 5, 6, 7, 8, 9, and 10, and where practical, values such as 6.8, 9.35, etc.). When values are expressed as approximations, by use of the antecedent "about," it will be understood that the particular value forms a further aspect. For example, if the value "about 10" is disclosed, then "10" is also disclosed.

Compositions or methods "comprising" or "including" one or more recited elements may include other elements not specifically recited. For example, a composition that "comprises" or "includes" a marker may contain the marker alone or in combination with other ingredients. The transitional phrase "consisting essentially of" means that the scope of a claim is to be interpreted to encompass the specified elements recited in the claim and those that do not materially affect the basic and novel characteristic(s) of the claimed invention. Thus, the term "consisting essentially of" when used in a claim of this invention is not intended to be interpreted to be equivalent to "comprising."

"Optional" or "optionally" means that the subsequently described event or circumstance may or may not occur and that the description includes instances in which the event or circumstance occurs and instances in which it does not.

The term "and/or" refers to and encompasses any and all possible combinations of one or more of the associated listed items, as well as the lack of combinations when interpreted in the alternative ("or"). The term "or" refers to any one member of a particular list and also includes any combination of members of that list.

The singular forms of the articles "a," "an," and "the" include plural references unless the context clearly dictates otherwise. For example, the term "a marker" or "at least one marker" can include a plurality of markers, including mixtures thereof.

The term "LED" or "OLED" refers to a light emitting diode (LED) or an organic light emitting diode (OLED). LEDs are inorganic semiconductor devices that emit light generated by recombination of electrons and electron holes. When current flows through an LED, energy is released in the form of photons of light. Organic light emitting diode are made from organic electroluminescent materials that is electrically conductive due to the delocalization of pi-electrons through conjugation over all or part of the molecule, generating an organic semiconductor. The organic materials can be crystalline, small organic molecules or polymers.

"LUMEN" refers to the International System of Units (SI) derived unit for luminous flux, measuring the total quantity of visible light emitted from a light source per a unit of time.

"CRI" refers to the color rendering index which is a quantitative measure of the ability of a light source to reveal the colors of various objects in comparison to a natural light source, sunlight, or a standard light source. The maximal value of 100 CRI is identical to sunlight. A CRI of 99, for example, applies to a light source that has a spectrum that is nearly identical to that of sunlight.

"Heat sink" refers to a passive heat exchanger that transfer the heat generated by an electronic or mechanical device to a medium, where it is dissipated away from the device, and the device's temperature is regulated. The materials used for heat sink applications must have high heat capacity and thermal conductivity such that more heat energy can be absorbed without raising the material's temperature too high; these materials must also be able to transmit the energy to the environment for efficient cooling. The most commonly used heat sinks are aluminum alloys. Light emitting diodes (LEDs) emit a significant amount of heat energy that must be regulated to ensure optimum performance; without heat sinks, the LEDs will result in lower light output, changes in color, and/or a reduction in the lifespan of this light source.

Any directional terms such as "top", "bottom", "above", "below", "up", "down" and "height" herein refer to the devices as they appear in the drawings. Joinder references (e.g., joined, attached, coupled, connected, and the like) are to be construed broadly and may include intermediate members between a connection of elements and relative movement between elements. As such, joinder references do not necessarily imply that two elements are connected directly and in fixed relation to each other. Further, various elements discussed with reference to the various embodiments may be interchanged to create entirely new embodiments coming within the scope of the device described herein.

II. Overview

Described herein is a photobleaching device for reducing autofluorescence of a biological sample with a light source having a light intensity for a specific amount of time, wherein the light intensity emanates from a broad spectrum of wavelengths. In certain embodiments, the irradiating light is tuned to the full spectrum of light from the upper UV spectrum through the visible spectrum. In certain embodiments, the irradiating light has a wavelength interval of 400 nm to 740 nm.

In embodiments, the photobleaching device comprises a plurality of light sources wherein each light source provides a full spectrum of light from upper UV (about 400 nm) through the visible spectrum (about 740 nm), and a CRI value of at least 90, at least 95, at least 96, at least 97, at least 98, or at least 99; and a sample tray, wherein the sample tray is adapted to hold one or more biological samples. The plurality of light sources comprises at least an upper light source and a lower light source. The upper light source and the lower light source are positioned such that the light emitted from the upper source is primarily directed towards the lower light source and the light emitted by the lower light source is primarily directed towards the upper light source. In other words, the upper and lower light sources are positioned such that the light emitted by both sources is primarily directed towards the space between the upper and lower light sources or towards a sample tray positioned between the upper and lower light sources.

The light source can be, but is not limited to, a xenon lamp, an arc lamp, a tungsten bulb, a photographic flash, a LED, an OLED, and combinations thereof. In some embodiments, the light source comprises an LED or plurality of LEDs. In some embodiments, the light source comprises an LED array, such as a linear LED array or a plurality of linear LEDs arrays arranged in a plane (i.e., a panel). A panel of linear LED arrays can comprise 1, 2, 3, 4, 5, or more linear LED arrays. If the photobleaching device comprises upper and lower light sources comprising panels, the panels are arranged in parallel planes.

In some embodiments, the upper and lower light sources each emit at least 800 lumens, at least 1000 lumens, at least 1200 lumens, at least 1400 lumens, at least 1600 lumens, at least 1800 lumens, at least 2000 lumens, at least 2200 lumens, or at least 2400 lumens. In some embodiments, the light output from the light sources is adjustable. Light output from the light sources can be adjusted by one or more dimmer switches. In some embodiments a dimmer switch can be used to reduce the light output by a light source from about 0% to about 100%. In some embodiments, the dimmer switch can alter light output from the light source such that the light source emits about 30% to 100% of its maximum light output. In some embodiments, the dimmer switch can alter light output from the light source such that the light source emits about 30%, about 40%, about 50%, about 60%, about 70%, about 80%, about 90%, or about 100% of its maximum light output.

The sample tray is adapted to hold one or more biological samples in a position about equidistant between the upper and lower light sources and permits light from both the upper and lower light sources to reach the one or more biological samples positioned in the sample tray. In other words, the sample tray is adapted to allow light to penetrate the biological samples from above and below the plane of the sample tray. If the photobleaching device contains comprises upper and lower light sources comprising panels, the sample tray is adapted to hold the biological samples in a plane parallel with the light source panels.

The upper and lower light sources can be positioned about 2, about 3, about 4, about 5, about 6, about 7, about 8, about 9, about 10, about 11, about 12, about 13, about 14, about 15, about 16, about 17, about 18, about 19, or about 20 cm apart. In some embodiments, the distance between the panels is variable, such that a user can alter the distance between the upper and lower light sources from about 2 cm to about 20 cm. The distance between the light sources can be adjusted using any means typically used in the art for such purpose. (e.g., threaded rods, connectors, etc.)

In some embodiments, the photobleaching device further comprises one or more mirrors. The mirrors can be placed above the upper light source, below the lower light source and/or on the 1, 2, 3, or 4 sides of the chamber defined by the light sources and the sample tray (photobleaching device), positioned to reflect light generally towards the sample tray. The mirrors can be flat or curved. In some embodiments, the mirrors are flat.

In some embodiments, the photobleaching device further comprises one or more power supplies connected to the light sources.

In some embodiments, the photobleaching device further comprises one or more heat dissipating devices. The one or more heat dissipating devices are positioned and adapted to absorb and/or dissipate heat. The heat dissipating devices can be, but are not limited to, fans or heat sinks. In some embodiments, the heat dissipating device comprises one or more heat sinks. In embodiments, the heat sink is a metal with a high heat capacity and thermal conductivity that is able to dissipate the excess heat generated by the light source without compromising the efficiency or functionality of the light source. In some embodiments, the heat dissipating device comprises one or more cooling fans. In certain embodiments, the cooling fans dissipate the excess heat generated by the light source without compromising the efficiency or functionality of the light source. In some embodiments, the heat sink comprises an aluminum heat sink. In some embodiments, the photobleaching device is placed in a cooling chamber. The cooling chamber can be, but is not limited to, a refrigerated container or a cold room.

In some embodiments, the photobleaching device further comprises a shield adapted to protect a user from the light emitted by the light sources. The shield can be, but is not limited to, a light-containing box, a light-blocking panels, a light-diffusing panel, black plastic sheeting, a black cloth, etc. In some embodiments, the device is covered with a black cloth to protect the user during the photobleaching protocol.

A biological sample can be placed in the photobleaching device an irradiated for about 1 to about 40 hours or more. In some embodiments, a biological sample can be placed in the photobleaching device and irradiated for at least 1 hour, at least 4 hours, at least 8 hours, at least 12 hours, at least 16 hours, at least 20 hours, at least 24 hours, at least 28 hours, at least 32 hours, or at least 36 hours.

The described photobleaching device can be used to reduce autofluorescence by at least 50% and up to 99% or more. The level of photobleaching is related to the inherent level of autofluorescence from each respective type of tissue sample.

Any of the described photobleaching devices can be used to treat a biological sample to reduce autofluorescence of the biological sample. The method comprises placing the biological sample in the sample tray of the photobleaching device and irradiating the biological sample with light using the photobleaching device. In some embodiments, irradiating the biological sample comprises irradiating the biological sample using the photobleaching device for at least 1 hour, at least 4 hours, at least 8 hours, at least 12 hours, at least 16 hours, at least 20 hours, at least 24 hours, at least 28 hours, at least 32 hours, or at least 36 hours. The length of time of irradiation can depend on the type of biological sample.

In certain embodiments, the method comprises an irradiating light that is tuned to the full spectrum of light from upper UV spectrum through the visible spectrum. In certain embodiments, the method further comprises an irradiating light that has a wavelength interval of 400 nm to 740 nm.

Methods for reducing autofluorescence are described comprising placing the biological sample in the sample tray of any of the described photobleaching devices and irradiating the biological sample with a plurality of light sources wherein each light source provides a full spectrum of light from upper UV (about 400 nm) through the visible spectrum (about 740 nm), and a CRI and a CRI value of at least 90, at least 95, at least 96, at least 97, at least 98, or at least 99. In some embodiments, the biological sample is placed on the sample tray, wherein the sample tray is adapted to hold one or more biological samples. In some embodiments, the sample tray can accommodate one or more microscope slides containing one or more biological samples. In some embodiments, the sample tray can accommodate 1 to 10 microscope slides containing one or more biological samples. In some embodiments, the sample tray can accommodate 2 to 8 microscope slides containing one or more biological samples. In some embodiments, the sample tray can accommodate 3 to 6 microscope slides containing one or more biological samples. In some embodiments, the sample tray can accommodate 1, 2, 3, 4, 5, 6, 7, 8, 9, or 10 microscope slides containing one or more biological samples. In some embodiments, the method comprises at least one of the pluralities of light sources positioned above the biological samples comprising the upper light source. In some embodiments, the method comprises positioning at least one of the pluralities of light sources below the biological samples comprising the lower light source. The upper light source is positioned such that the light emitted from the upper light source is primarily directed towards the lower light source and the lower light source is positioned such that the light emitted from the lower light source is primarily directed towards the upper light source. In other words, the method described above comprises positioning the upper and lower light sources such that the light emitted from both sources is primarily directed towards the space between the upper and lower light sources or towards a sample tray positioned between the upper and lower light sources.

The light source of the photobleaching device can be, but is not limited to, an arc lamp, a tungsten bulb, a photographic flash, a LED, an OLED, and combinations thereof. In some embodiments, the light source comprises an LED or plurality of LEDs. In some embodiments, the light source comprises an LED array, such as a linear LED array or a plurality of linear LEDs arrays arranged in a plane (i.e., a panel). A panel of linear LED arrays can comprise 1, 2, 3, 4, 5, or more linear LED arrays. In some embodiments, LEDs can be daisy chained length wise to increase the area that can be irradiated. In some embodiments described herein, if the method of photobleaching comprises upper and lower light sources comprising panels, the panels are arranged in parallel planes.

In certain embodiments, the light sources of the photobleaching device each emit at least 800 lumens, at least 1000 lumens, at least 1200 lumens, at least 1400 lumens, at least 1600 lumens, at least 1800 lumens, at least 2000 lumens, at least 2200 lumens, or at least 2400 lumens. In some embodiments, the light output from a light source is adjustable.

Light output from the light sources can be adjusted by one or more dimmer switches. In some embodiments a dimmer switch can be used to reduce the light output by a light source from about 0% to about 100%. In some embodiments, the dimmer switch is used to reduce the light output by a light source by about 70%. In some embodiments, the dimmer switch is used to reduce the light output by a light source by about 70%, at a distance of about 2 cm to about 15 cm (e.g., about 1 cm, about 2 cm, about 3 cm, about 4 cm, about 5 cm, about 6 cm, about 7 cm, about 8 cm, about 9 cm, or about 10 cm) the light source. In some embodiments, the dimmer switch can alter light output from the light source such that the light source emits about 0% to about 100% of its maximum light output. In some embodiments, the dimmer switch can alter light output from the light source such that the light source emits about 10%, about 20%, about 30%, about 40%, about 50%, about 60%, about 70%, about 80%, about 90%, or about 100% of its maximum light output.

Irradiating the biological sample to the plurality of light sources comprises placing the sample on a sample tray in any of the photobleaching devices described above, wherein the sample tray is adapted to hold one or more biological samples in a position about parallel and equidistant between the upper and lower light sources. In some embodiments, the sample tray is adapted to hold the biological sample and to allow light to penetrate the biological sample from above and from below the plane of the sample tray.

In embodiments, the method comprises positioning the light sources about 5, about 6, about 7, about 8, about 9, about 10, about 11, about 12, about 13, about 14, about 15, about 16, about 17, about 18, about 18, or about 20 cm apart.

In some embodiments, reducing autofluorescence of the biological sample comprises reducing autofluorescence of the biological sample by at least 50% and up to 99% or more compared to the level of autofluorescence of the biological sample prior to the irradiation or compared to a similar biological sample that has not been irradiated by the plurality of light sources.

Described herein are methods for reducing autofluorescence of a biological sample comprising irradiating a biological sample with a plurality of light sources, wherein the irradiating light emanates from a broad spectrum of wavelengths, for a specific length of time. In certain embodiments, the method comprises an irradiating light that is tuned to the full spectrum of light from upper UV spectrum through the visible spectrum. In certain embodiments, the method further comprises an irradiating light that has a wavelength interval of 400 nm to 740 nm.

Methods for reducing autofluorescence of a biological sample are described comprising exposing the biological sample to a plurality of light sources wherein each light source provides a full spectrum of light from upper UV (about 400 nm) through the visible spectrum (about 740 nm), and a CRI and a CRI value of at least 90, at least 95, at least 96, at least 97, at least 98, or at least 99. In some embodiments, the biological sample is placed on a sample tray, wherein the sample tray is adapted to hold the biological sample. In some embodiments, the sample tray can accommodate one or more microscope slides containing one or more biological samples. In some embodiments, the sample tray can accommodate 1 to 10 microscope slides containing one or more biological samples. In some embodiments, the sample tray can accommodate 2 to 8 microscope slides containing one or more biological samples. In some embodiments, the sample tray can accommodate 3 to 6 microscope slides containing one or more biological samples. In some embodiments, the sample tray can accommodate 1, 2, 3, 4, 5, 6, 7, 8, 9, or 10 microscope slides containing one or more biological samples. In some embodiments, at least one of the pluralities of light sources is positioned above the biological sample. In some embodiments, at least one of the pluralities of light sources is positioned below the biological sample. In some embodiments, at least one of the pluralities of light sources is positioned above the biological sample and at least one of the pluralities of light sources is positioned below the biological sample. The upper light source is positioned such that the light emitted from the upper light source is primarily directed towards the lower light source and the light emitted is positioned such that the light emitted from the lower light source is primarily directed towards the upper light source. In other words, the upper and lower light sources are positioned such that the light emitted from both sources is primarily directed towards the space between the upper and lower light sources or towards a sample tray holding the biological sample and positioned between the upper and lower light sources.

The light source can be, but is not limited to, an arc lamp, a tungsten bulb, a photographic flash, a LED, an OLED, or combinations thereof. In some embodiments, the light source comprises an LED or plurality of LEDs. In some embodiments, the light source comprises an LED array, such as a linear LED array or a plurality of linear LEDs arrays arranged in a plane (i.e., a panel). A panel of linear LED arrays can comprise 1, 2, 3, 4, 5, or more linear LED arrays. In some embodiments, LEDs can be daisy chained length wise to increase the area that can be irradiated. In some embodiments, the upper and lower light sources comprising panels, the panels are arranged in parallel planes.

In certain embodiments, the light sources each emit at least 800 lumens, at least 1000 lumens, at least 1200 lumens, at least 1400 lumens, at least 1600 lumens, at least 1800 lumens, at least 2000 lumens, at least 2200 lumens, or at least 2400 lumens. In some embodiments, the light output from a light source is adjustable. Light output from the light sources can be adjusted by one or more dimmer switches. In some embodiments a dimmer switch can be used to reduce the light output by a light source by 0% to about 70%. In some embodiments, the dimmer switch can alter light output from the light source such that the light source emits about 30% to 100% of its maximum light output. In some embodiments, the dimmer switch can alter light output from the light source such that the light source emits about 30%, about 40%, about 50%, about 60%, about 70%, about 80%, about 90%, or about 100% of its maximum light output.

Exposing the biological sample to the plurality of light sources comprises placing the biological sample on a sample tray, wherein the sample tray is adapted to hold one or more biological samples in a position at a about equidistant between the upper and lower light sources. In some embodiments, the sample tray is adapted to hold the biological sample and to allow light to penetrate the biological sample from above and from below.

In embodiments, the above method comprises positioning the upper and lower light sources about 5, about 6, about 7, about 8, about 9, about 10, about 11, about 12, about 13, about 14, about 15, about 16, about 17, about 18, about 18, or about 20 cm apart. The distance between the upper and lower light panels can be adjusted depending on the type of biological sample.

In some embodiments, the above method further comprises placing a mirror above the upper light source and/or placing a mirror below the lower lights source, wherein the mirrors are positioned to reflect light generally towards the biological sample. In some embodiments, the above method further comprises placing one or more mirrors on 1, 2, 3, or 4 sides of a chamber defined by the light sources and the sample tray, wherein the mirrors are positioned to reflect light generally towards the biological sample. In some embodiments, the above method further comprises placing a mirror above the upper light source, a mirror below the lower light source, and 1-4 mirrors positions at the 1-4 sides of the sides of the chamber defined by the light sources and the sample tray wherein the mirrors are positioned to reflect light generally towards the biological sample. The mirrors can be flat or curved. In some embodiments, the mirrors are flat.

In some embodiments, the method described above comprises dissipating excess heat generated by the light sources using one or more heat dissipating devices, including, but not limited to, fans or heat sinks. In some embodiments, the method comprises using a heat dissipating device that is one or more heat sinks. In embodiments, the method comprises positioning and adapting one or more heat sinks such that they absorb and dissipate heat generated by a light source. In embodiments, the method comprises using one or more metal heat sinks with a high heat capacity and thermal conductivity that is able to dissipate the excess heat generated by the light source without compromising the efficiency or functionality of the light source. In some embodiments, the method comprises one or more heat sinks that are aluminum heat sinks. In some embodiments, the method comprises using a heat dissipating device that is one or more cooling fans. In embodiments, the method comprises positioning and adapting one or more cooling fans such that they dissipate heat generated by a light source. In embodiments, the method further comprises using one or more cooling fans that can dissipate the excess heat generated by the light source without compromising the efficiency or functionality of the light source. In certain embodiments, the cooling fans dissipate the excess heat with minimal effects to the biological samples.

In some embodiments, exposing the biological sample to the plurality of light sources irradiate the biological sample for at least 1 hour, at least 4 hours, at least 8 hours, at least 12 hours, at least 16 hours, at least 20 hours, at least 24 hours, at least 28 hours, at least 32 hours, or at least 36 hours. The length of time of irradiation can depend on the type of biological sample.

In some embodiments, reducing autofluorescence of the biological sample comprising reducing autofluorescence of the biological sample by at least 50% and up to 99% or more compared to the level of autofluorescence of the biological sample prior to the irradiation or compared to a similar biological sample that has not been irradiated by the plurality of light sources.

EXAMPLES

Example 1: Photobleaching Device Assembly

Displayed in FIG. 2 is the photobleaching device described herein. It consists of two light panels, each comprising 3 linear LED arrays. These linear LED arrays emanate a broad spectrum of light from the upper UV spectrum (approximately 400 nm) through the visible spectrum (approximately 740 nm) at approximately 800 lumen power and have a CRI of 99, suggesting that the linear LED arrays emit a spectrum of light very similar to that of sunlight (FIG. 1). The two light panels comprise the upper light source and the lower light source. A sample tray which can hold multiple samples is positioned directly between the upper and lower light sources. The upper and lower light sources are positioned such that the light emitted from the upper light source is primarily directed towards the sample tray and the lower light source and the light emitted from the lower light source is primarily directed towards the sample tray and the upper light source. The sample tray is positioned approximately an equidistant 8 cm from the upper and lower light source in a central plane parallel to both the upper and lower light source using threaded rods and connectors as needed. The device also contains 4 mirrors, positioned above the upper light source, below the lower light source and on either side, such that the emitted light is reflected towards the sample tray. Additional mirrors may also be used. The photobleaching device also contains an inline dimmer and aluminum heat sinks. The dimmer alters the light output of the LEDs panels. The aluminum heat sinks dissipate the excess heat generated from the LED panels without compromising the efficiency or functionality of the linear LED arrays. The photobleaching device is connected to a power supply. The photobleaching device is housed in a cold room (4° C.) and is placed under a black cloth during the photobleaching process. Alternatively, the device could include an active or passive cooling system analogous to the systems used to cool computer systems, including fans coupled to heat sinks or fans attached to water-based radiators, either of which will cool the heat sinks which then effects the temperature of the aluminum hosed LEDs.

Larger photobleaching devices able to accommodate additional samples are readily made using a larger light source array and/or a larger sample tray.

Example 2: Photobleaching Spleen Samples to Reduce Autofluorescence

Human spleen samples normally have high levels of autofluorescence at 550 nm and 647 nm. We prepared human spleen tissue samples for fluorescence microscopy and acquired fluorescence images at 550 nm and 647 nm before and after photobleaching. For photobleaching, the spleen samples were place in 5% $H_2O_2$/20 mM phosphate buffered saline, placed in the photobleaching device described in example 1, and exposed to light at 70% output based on the dimmer settings for 36 hours. As shown in FIG. 3, autofluorescence was dramatically reduced in the photobleached samples compared to the samples prior to photobleaching. Similar results were observed for mouse and human pancreas and human lung.

Example 3: Photobleaching Human Pancreas to Reduce Autofluorescence

The photobleaching device has been routinely used in multiplex fluorescent imaging experiments to study human pancreas. Three groups were studied: unaffected, Type 1 diabetes, and unaffected/autoantibody positive human pancreata using an Akoya Phenocycler (previously called CODEX) system (https://www.akoyabio.com) coupled with a Keyence microscope (https://www.keyence.com). Therefore, a total of 24 patient organ donor pancreata were studied using two panels of antibodies as detailed below.

A cover slip with a thin section (5 microns) of human pancreas previously formalin fixed and paraffin embedded were photobleached to eliminate inherent tissue autofluorescence. The tissue fluorescent images were then collected for 32-36 protein antigens per patient using oligonucleotide bar-coded antibodies using the automated Phenocycler/CODEX system.

A total of 48 runs were performed: two different antibody panels and two separate thin sections from the 24 pancreata from each organ donor as detailed in Table 1 below. The photobleaching device made possible the acquisition of hundreds of terabytes of imaging data without conflicting issues of autofluorescence.

TABLE 1

Multiplex Fluorescent Imaging With Tissue Photobleaching

| Donors | Multiplex Panel 1 | Multiplex Panel 2 |
| --- | --- | --- |
| Donor 1 | 32 Antibodies | 36 Antibodies |
| Donor 2 | 32 Antibodies | 36 Antibodies |
| Donor 3 | 34 Antibodies | 36 Antibodies |
| Donor 4 | 34 Antibodies | 36 Antibodies |
| Donor 5 | 34 Antibodies | 36 Antibodies |
| Donor 6 | 35 Antibodies | 36 Antibodies |
| Donor 7 | 35 Antibodies | 36 Antibodies |
| Donor 8 | 35 Antibodies | 36 Antibodies |
| Donor 9 | 35 Antibodies | 36 Antibodies |
| Donor 10 | 32 Antibodies | 36 Antibodies |
| Donor 11 | 32 Antibodies | 36 Antibodies |
| Donor 12 | 34 Antibodies | 36 Antibodies |
| Donor 13 | 34 Antibodies | 36 Antibodies |
| Donor 14 | 34 Antibodies | 36 Antibodies |
| Donor 15 | 35 Antibodies | 36 Antibodies |
| Donor 16 | 35 Antibodies | 36 Antibodies |
| Donor 17 | 35 Antibodies | 36 Antibodies |
| Donor 18 | 32 Antibodies | 36 Antibodies |
| Donor 19 | 32 Antibodies | 36 Antibodies |
| Donor 20 | 34 Antibodies | 36 Antibodies |
| Donor 21 | 32 Antibodies | 36 Antibodies |
| Donor 22 | 34 Antibodies | 36 Antibodies |
| Donor 23 | 34 Antibodies | 36 Antibodies |
| Donor 24 | 34 Antibodies | 36 Antibodies |

What is claimed is:

1. A photobleaching device for reducing autofluorescence of a biological sample, comprising:
   a plurality of light sources comprising an upper light source and a lower light source, wherein each light source provides a full spectrum light from upper UV at about 400 nm through the visible spectrum at about 740 nm, and a CRI value of at least 90, wherein the light emitted by the upper and lower light sources is directed towards a sample tray positioned between the upper and lower light sources; and,
   a sample tray, wherein the sample tray is adapted to hold one or more biological samples.

2. The device of claim 1, wherein the light source has a CRI value of at least 95, at least 96, at least 97, at least 98, or at least 99.

3. The device of claim 1, wherein the upper and lower light sources each emit at least 800 lumens, at least 1000 lumens, at least 1200 lumens, at least 1400 lumens, at least 1600 lumens, at least 1800 lumens, at least 2000 lumens, at least 2200 lumens, or at least 2400 lumens.

4. The device of claim 1, wherein the light emitted by the upper and lower light sources is directed towards a sample tray positioned between the upper and lower light sources.

5. The device of claim 1, wherein the light source comprises a plurality of LEDs or one or more linear LED arrays.

6. The device of claim 5, wherein the upper and lower light sources each comprise a panel comprising a plurality of linear LED arrays arranged in a plane.

7. The device of claim 1, wherein the upper and lower light sources are positioned about 5, about 6, about 7, about 8, about 9, about 10, about 11, about 12, about 13, about 14, about 15, about 16, about 17, about 18, about 19, or about 20 cm apart.

8. The device of claim 7, wherein the distance between the upper and lower light sources is adjustable from about 5 cm to about 20 cm.

9. The device of claim 1, wherein the light output from the light sources is adjustable via one or more dimmer switches.

10. The device of claim 9, wherein the one or more dimmer switches are configured to adjust the light output from the light sources by about 100% to about 30% of its maximum light output.

11. The device of claim 1, wherein the sample tray is adapted to hold one or more biological samples in a position about parallel and about equidistant from the upper and lower light sources and permits light from both the upper and lower light sources to reach the one or more biological samples.

12. The device of claim 1, wherein the device further comprises one or more mirrors to reflect light from the light sources, wherein the mirrors are positioned above the upper light source and/or below the lower light source and are positioned to reflect light towards the sample tray.

13. The device of claim 2, wherein the device further comprises one or more of the following:
one or more power supplies connected to the light sources;
one or more heat dissipating devices adapted to absorb and/or dissipate heat generated by the light source; and
a shield adapted to protect a user from the light emitted by the light sources.

14. The device of claim 13, wherein the one or more heat dissipating devices comprise one or more fans and/or heat sinks.

15. A method of reducing autofluorescence of a biological sample, comprising irradiating the biological sample with one or more light sources having a CRI value of at least 90, wherein the one or more light sources comprise an upper light source and/or a lower light source, and wherein each light source provides a full spectrum light from about 400 nm to about 740 nm.

16. The method of claim 15, wherein the upper and lower light sources:
(a) each comprise a plurality of LEDs having a CRI value of at least 95, at least 96, at least 97, at least 98, or at least 99;
(b) each emit at 800 lumens, at least 1000 lumens, at least 1200 lumens, at least 1400 lumens, at least 1600 lumens, at least 1800 lumens, at least 2000 lumens, at least 2200 lumens, or at least 2400 lumens; and
(c) are positioned about 5, about 6, about 7, about 8, about 9, about 10, about 11, about 12, about 13, about 14, about 15, about 16, about 17, about 18, about 19, or about 20 cm apart.

17. The method of claim 15, wherein the biological sample is positioned in a sample tray positioned about parallel and about equidistant from the upper and lower light sources.

18. The method of claim 15, wherein irradiating the biological sample comprises irradiating the biological sample at least 24 hours, at least 28 hours, at least 32 hours, at least 36 hours, at least 40 hours, at least 44 hours, or at least 48 hours.

19. A method of reducing autofluorescence from a biological sample, comprising placing the biological sample into the device of claim 1 and irradiating with light for at least at least 24 hours, at least 28 hours, at least 32 hours, at least 36 hours, at least 40 hours, at least 44 hours, or at least 48 hours.

20. The method of claim 19, wherein the biological sample is irradiated for at least 36 hours.

* * * * *